US005319186A

United States Patent [19]

Lenhardt

[11] Patent Number: 5,319,186

[45] Date of Patent: Jun. 7, 1994

[54] APPARATUS FOR CONTROLLING THE MOVEMENT OF A TOOL ALONG THE EDGE OF GLASS PANES

[75] Inventor: Karl Lenhardt, Neuhausen-Hamberg, Fed. Rep. of Germany

[73] Assignee: Lenhardt Maschinenbau GmbH, Neuhausen-Hamberg, Fed. Rep. of Germany

[21] Appl. No.: 983,536

[22] PCT Filed: Sep. 5, 1991

[86] PCT No.: PCT/EP91/01677

§ 371 Date: Mar. 2, 1993

§ 102(e) Date: Mar. 2, 1993

[87] PCT Pub. No.: WO92/04521

PCT Pub. Date: Mar. 19, 1992

[30] Foreign Application Priority Data

Sep. 7, 1990 [DE] Fed. Rep. of Germany .... 4028485.9
Oct. 23, 1990 [DE] Fed. Rep. of Germany ....... 4033585

[51] Int. Cl.[5] .............................................. B32B 31/10

[52] U.S. Cl. .................................... 250/202; 250/560; 356/386; 156/109

[58] Field of Search .................... 250/202, 223 R, 560; 318/577; 356/375, 376, 383, 384, 385, 386; 156/109, 356

[56] References Cited

U.S. PATENT DOCUMENTS 2,275,811 3/1942 Woelfel .
4,145,237 3/1979 Mercier et al. ..................... 156/109
4,561,929 12/1985 Lenhardt ............................. 156/109
4,973,436 11/1990 Lisec .................................. 156/109
5,051,145 11/1991 Lenhardt ............................ 156/109
5,136,974 8/1992 Lisec .................................. 156/356

FOREIGN PATENT DOCUMENTS 0103925 8/1983 European Pat. Off. .
0252066 6/1987 European Pat. Off. .
0337978 2/1989 European Pat. Off. .
0329224 8/1989 European Pat. Off. .
4033585 10/1990 Fed. Rep. of Germany .

*Primary Examiner*—David C. Nelms
*Assistant Examiner*—S. B. Allen
*Attorney, Agent, or Firm*—Dvorak and Traub

[57] ABSTRACT

The apparatus comprises a horizontal conveyor (1), on which the glass panes (4) are conveyed while they are supported by backing means (2), which by their supporting forward surface define a plane of pane travel (3), a tool (18) for processing the glass panes (4) along their edge and a drive motor for displaying the tool (18) in a direction which is parallel to the plane of pane travel (3) and transverse to the direction of travel (5). For a control of the movement of the tool (18), electronic line cameras (8) are provided, which are so directed toward the plane of pane travel (3) that their scanning lines extend in or parallel to the plane of pane travel and at right angles to the direction of travel (5). For measuring the distance traveled, a displacement pick-up (15) is provided, which is synchronized with the horizontal conveyor (1). The signals from the line cameras (8) and from the displacement pickup (15) are delivered to an evaluating computer (16) for controlling the tool (18).

20 Claims, 2 Drawing Sheets

APPARATUS FOR CONTROLLING THE MOVEMENT OF A TOOL ALONG THE EDGE OF GLASS PANES

TECHNICAL FIELD

This invention relates to an apparatus for controlling the movement of a tool along the edge of glass panes, particularly of insulating glass panes, comprising a horizontal conveyor, on which the glass panes are conveyed while they are supported by backing means, which by their supporting forward surface define a plane of pane travel, also comprising one or more optical sensors, which scan the glass panes, and a drive motor for displacing the tool in a direction which is parallel to the plane of travel of the panes and transverse to the direction of travel of the horizontal conveyor.

PRIOR ART

Such an apparatus is known from DE-C-28 16 437. In the known apparatus a nozzle for sealing the edge gap of insulating glass panes is controlled by a photodetector, which is moved in unison with the sealing nozzle and indicates the arrival of the nozzle at a corner of the insulating glass pane. The photodetector controls the drive of the nozzle in such a manner that the nozzle is pivotally moved through 90° at the corner of the insulating glass pane and then moves along the adjoining portion of the edge of the insulating glass pane. That control mode is well adapted fro use with rectangular insulating glass panes but is less suitable for controlling the movement of a tool along the edge of individual glass panes or of insulating glass panes which have a non-rectangular configuration —so-called model panes. For a control of the movement of a tool along the edge of model panes it is known to use a numerically controlled drive for moving the tool and to store selected configurations of model panes in a data memory and, whenever a glass pane having a stored configuration is to be processed, to read out by a computer the characteristic data defining the configuration and to control the tool in accordance therewith. That practice has the disadvantage that glass panes having a configuration which has not been stored cannot be automatically processed but must be processed by hand. Another disadvantage resides in that the means for the numerical control for the tool must somehow be informed that a model pane is to be processed and what is the configuration of that glass pane, e.g., in that the configuration and size of the glass panes are initially detected and the glass panes are coded by the application of a machine-readable data carrier, which is read in the processing apparatus by a reader, which is connected to the computer by which the movement of the tool is controlled, (EP-A-0 252 066) or in that the dimensions of the glass panes to be processed and the order in which they are supplied for being processed are determined from the beginning for an entire production sequence by a detailed computer-assisted manufacturing program. But most manufacturers who process glass panes are not prepared to make such a detailed manufacturing program and such program would not be sufficiently versatile in view of the continual change of the size of the glass panes to be processed.

SUMMARY OF THE INVENTION

It is an object of the present invention to provide for the control of the movement of a tool along the edge of glass panes an apparatus which permits an automatic processing of rectangular glass panes and of model panes of any desired configuration as they arrive, i.e., in any desired order, without a detailed manufacturing program and without an application of machine-readable data carriers.

That object is accomplished by the provision of an apparatus for controlling the movement of a tool along the apparatus for controlling the movement of a tool along the edge of glass panes, particularly of insulating glass panes, comprising a horizontal conveyor, on which the glass panes are conveyed while they are supported by backing means, which by their supporting forward surface define a plane of pane travel, also comprising one or more optical sensors, which scan the glass panes, and a drive motor for displacing the tool in a direction which is parallel to the plane of travel of the panes and transverse to the direction of travel of the horizontal conveyor wherein the optical sensors consist of one or more electronic line cameras, which are so directed toward the plane of pane travel that their scanning lines extend in or parallel to the plane of pane travel and at right angles to the direction of travel, a displacement pickup for measuring the distance traveled is synchronized with the horizontal conveyor and an evaluating computer is provided, which is connected at its input to the output of the line camera(s) and to the output of the displacement pickup and at its output to the drive motor of the tool. Desirable further features of the invention are subject matters of the dependent claims.

In agreement with the teaching of DE-C 28 16 437 the invention is based on the assumption that the glass panes, preferably standing on edge, are conveyed by a horizontal conveyor, which may consist, e.g., of a belt conveyor or a roller conveyor or of horizontally movable supports, which support the glass panes from below. But on principle the glass panes may alternatively be conveyed in a horizontal orientation. The backing means may consist, e.g., of an air cushion wall having a forward surface which defines the plane of pane travel, or of a row of backing rollers, which are adjustable in height (DE-C-30 38 425) and by which the glass panes standing on a horizontal conveyor are backed near their top edge, or of a field of backing rollers having a common front tangential plane which defines the plane of pane travel, or of one or more conveyor belts or vacuum conveyor belts, which are driven in synchronism with the horizontal conveyor.(EP-A-0 222 349) and which may constitute the horizontal conveyor.

A drive motor is provided for displacing the tool in a direction which is parallel to the plane of pane travel and transverse (particularly at right angles) to the direction of travel of the horizontal conveyor and may consist, e.g., of an electric stepping motor. In accordance with the invention, one or more electronic line cameras are provided for scanning the glass panes and for controlling the drive motor of the tool and have a field of view which is constituted by one or more lines and said line cameras are so directed toward the plane of pane travel that the projections of the scanning line(s) of each line camera on the plane of pane travel or on the glass pane extending in the plane of pane travel extends or extend at right angles to the direction of travel of the horizontal conveyor. As a result, in the region in which a scanning line sweeps a given glass pane the line camera detects the extent of the glass pane at right angles to the direction of travel. Because the horizontal conveyor moves the glass pane transversely to the scanning line, a given line camera will detect in the course of the conveying movement, e.g., the height of the glass pane in dependence on its length. For this reason the configuration of a given glass pane can be determined in that the line camera concerned detects the height and the slipfree movement of the glass pane on the horizontal conveyor. For that purpose the invention provides also a displacement pickup, which is synchronized with the horizontal conveyor and permits a measurement of the distance travelled. The displacement pickup may consist, e.g., of an incremental angle encoder, which is mounted on a shaft, which is driven in synchronism with the horizontal conveyor, and that angle encoder may deliver to an evaluating computer electric pulses in proportion to the increments of movement of the angle encoder; that evaluating computer is also supplied with the output signals of the line cameras. As a result, the full information on the extent of the glass panes in two directions, namely, in the direction of travel and transversely to the direction of travel, is available to the evaluating computer so that the latter has all informations required for the control of a tool along the edge of the glass panes. On principle there is no restriction regarding the configuration of the contour of the glass panes. It is possible to automatically process rectangular as well as model panes controlled as desired and the sequence in which they are delivered to the processing tool need not be determined in advance.

The nature of the processing tool is not critical; it may consist of a nozzle with which the edge gap of an insulating glass pane is sealed or of a grinding tool by which a coating is removed along the edge of a glass pane or of a tool with which a prefabricated plastically deformable extruded spacer is applied to a glass pane along its edge.

The line camera concerned is preferably directed toward the plane of pane travel at an angle other than 90° to the direction of travel or at right angles to the direction of travel out at an angle other than 90° to the plane of pane travel. In that case, a light source directed toward the plane of pane travel may be provided on the same side of the plane of pane travel as the line camera in such an arrangement that a substantial part of the light emitted by the light source is reflected by the glass panes to the line camera so that the latter can distinctly recognize the glass pane. To increase the contrast, a blackened surface is preferably provided on that side of the plane of pane travel which faces away from the light source and so that light which has been transmitted through the glass pane will be absorbed by said blackened surface rather than reflected to the line camera.

On principle, a single line camera will be sufficient for determining the configuration of the glass panes. The objective lens of the line camera has a predetermined angular field, which must accommodate the size of the pane, namely, the extent of the glass panes in the direction which is transverse to their direction of travel. To increase the accuracy of the measurement it may be desirable, particularly with relatively large glass panes, to provide not only one line camera but two or more line cameras, which are so arranged that on the object side their scanning lines are aligned and the scanning lines of adjacent line cameras preferably overlap in part. If the position of the line cameras is known, the evaluating computer will be able to determine the configuration of the glass panes from the combined signals from the line cameras as from the output signal of a single line camera.

The line cameras need not be displaced in adaptation to different pane sizes. For this reason the line cameras are suitably stationary and are merely adjustable. Alternatively, a measurement with a high resolution can be achieved with a single line camera even if the glass panes are large if that one line camera is arranged to be displaced by a stepping motor in a direction which is at right angles to the direction of travel and parallel to the plane of pane travel and, in addition, a displacement pickup is provided, which is synchronized with the stepping motor and has an output which is also connected to the evaluating computer. From a position in which one edge of a glass pane, particularly the edge standing on a horizontal conveyor, is in the field of view of the line camera, the latter may be caused by the stepping motor to perform a progressive follow-up movement, which is transverse to the direction of travel, until the opposite edge of the glass pane appears in the field of view of the line camera. In that case it will be sufficient for the evaluating computer to add the measured value derived from the output signal of the line camera to the measured value which in dependence on the position of the stepping motor is derived from the output signal of the displacement pickup coupled to the stepping motor. In that case a second line camera can be saved.

The line cameras are preferably arranged behind the backing means and view the glass plates through an aperture in the backing means. Behind the backing means the line cameras can better be protected from environmental influences and will remain freely accessible for inspections and manipulations.

In dependence on the nature of the processing to be performed, it may be sufficient for the tool to be displaceable only transversely, preferably at right angles, to the direction of travel of the horizontal conveyor. In other cases, particularly if the tool is a nozzle for filling the edge gap of an insulating glass pane, it will be necessary to provide—as disclosed in DE-C-28 16 437—a rotary drive for rotating or pivotally moving the tool about an axis which is at right angles to the plane of pane travel; in that case the output of the evaluating computer is suitably connected also to the rotary drive and controls the rotary movement of the tool, e.g., the rotation of a nozzle when the latter has reached a corner of an insulating glass pane. In that case the evaluating computer preferably delivers not only a control signal to the drive motor for displacing the tool transversely to the direction of travel of the horizontal conveyor but delivers to the rotary drive for the tool a further signal, which indicates the inclination or slope of the glass pane relative to the direction of travel. That signal may be generated in that the signal which has been generated by the line camera and represents the dimension of the glass pane measured transversely to the direction of travel is differentiated with respect to the distance traveled, which is represented by the output signal of the displacement pickup which is synchronized with the horizontal conveyor. Hence, mathematically speaking the signal delivered to the rotary drive is the first derivative of the sigal delivered to the drive motor for displacing the tool transversely to the direction of travel. This permits an automatic adaptation of the orientation of the tool to the contour of the edge of the pane even if the edge of the glass pane has any desired curvature. In that way it is possible, e.g., to ensure that a tool, such as a sealing nozzle, is oriented at a constant angle to the instantaneous tangent to the edge of the glass pane.

On principle, the arrangement of the line cameras relative to the tool may so be selected that the tool is subjected to on-line control. But in dependence on the nature of the tool and of the intended processing it may be more desirable to determine the configuration of the glass pane before it reaches the tool. In that case the evaluating computer is provided with a memory for a temporary storage of the detected dimensions of the glass pane and the data for the control of the tool are retrieved from that memory after a time delay. An essential advantage afforded by that measure resides in that the stored data for the control of different tools, which are used in succession for different processing actions, such as grinding and coating, on the glass plates, can repeatedly be retrieved from the memory. Another advantage afforded by that measure resides in that it permits an increase of the resolution of the measurement. Because a finite time is required for the reception, temporary storage, and evaluation of the picture signals in each line and the advancing glass pane travels a certain distance during that time, the dimension of the pane in the direction of the scanning lines cannot be determined continuously but only in predetermined increments of time and space. The smaller the spacing (or resolving power) of two scanning lines, the higher is the perfection with which a tool can be guided along the edge of a glass pane. In the simplest case the resolving power can be increased in that the speed of travel of the glass pane is reduced, although this will be unfavorable for the economy of the apparatus. It is better to use line cameras having a field of view which is composed of a plurality of parallel lines rather than of a single line. Such a multi-line line camera may differ from a single-line line camera, e.g., in that it comprises as a light-sensitive receiver a multi-line CCD (CCD array) rather than a single-line CCD. The picture signals received by the lines of such a multi-line charge-coupled receiver may be stored temporarily and evaluated in succession, for instance, in that the signals from one line are temporarily stored, the temporarily stored signals from another line are evaluated and the evaluated signals from a third line are used to control the tool. In that case the resolving power can be increased in proportion to the number of lines of the line camera.

EMBODIMENTS OF THE INVENTION

Two illustrative embodiments of the invention are schematically shown in the accompanying drawings and will be described hereinafter.

Figure 1:
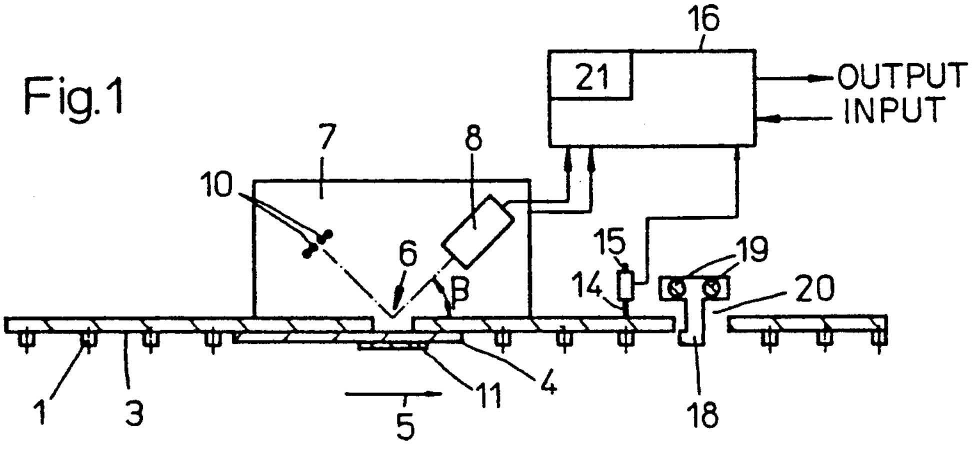
FIG. 1 is a horizontal sectional view showing the apparatus.
Figure 2:
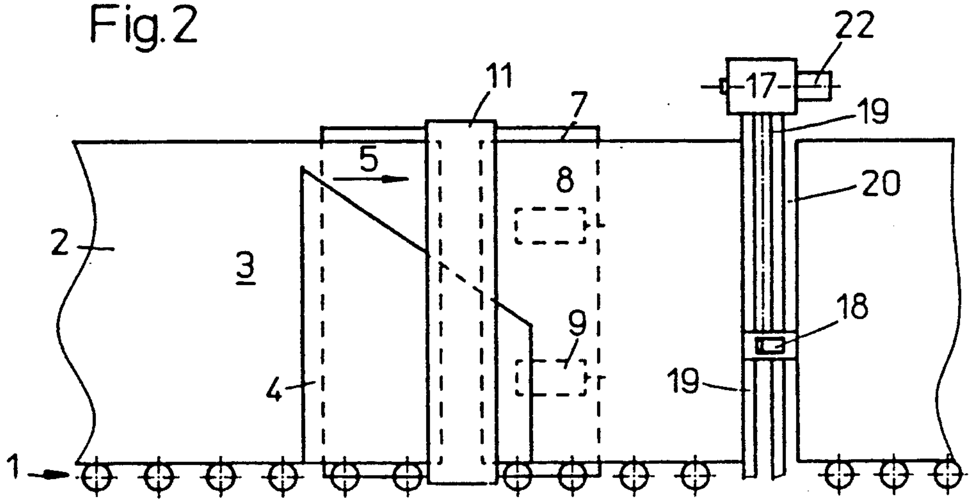
FIG. 2 is a front elevation showing the apparatus.
Figure 3:
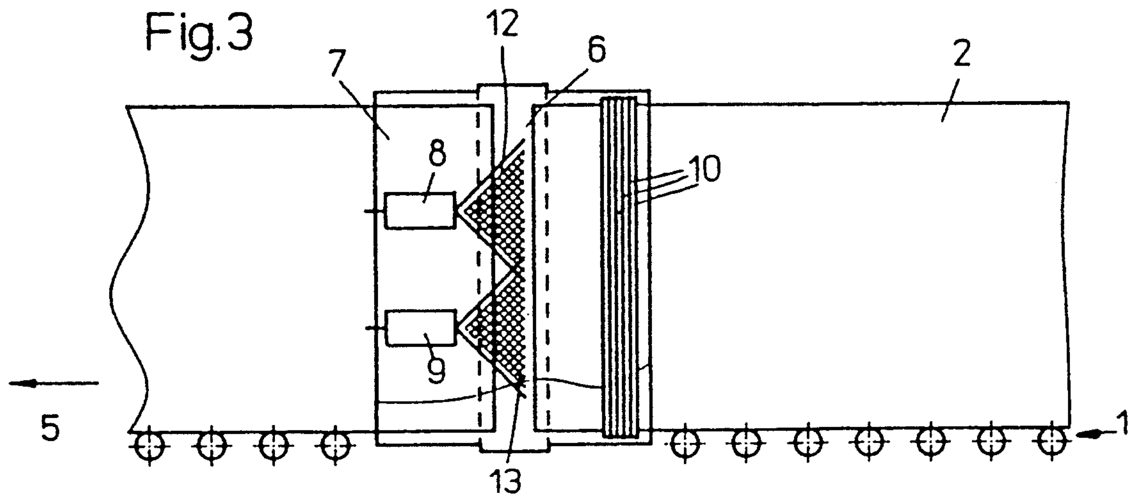
FIG. 3 is a rear elevation showing the apparatus.

The apparatus comprises a horizontal conveyor 1 consisting of a row of rollers, which are driven in synchronism and are mounted on a frame, not shown. Backing means 2 extending above the horizontal conveyor are constituted by a wall, which is carried by the same frame as the horizontal conveyor and is mounted on the same frame as the horizontal conveyor and is slightly rearwardly inclined. The wall may consist of an air cushion wall, which has bores, through which air is blown out. The horizontal conveyor 1 protrudes over the forward surface of the wall and that forward surface defines a plane of pane travel for glass panes 4, which stand on the horizontal conveyor 1 and lean against the wall 2 as they are conveyed in the direction indicated by the arrow 5.

The wall 2 is formed with a vertical slot 6. Behind the slot 6 two electronic line cameras 8 and 9 spaced from the wall and arranged on one side of the slot and a number of substantially vertically extending rod-shaped lamps 10 arranged on the other side of the slot 6 are disposed in a protective housing 7. The arrangement is such that a considerable part of the light emitted by the lamps 10 and impinging on a glass pane 4 disposed beyond the slot 6 will be reflected by the glass pane toward the cameras 8 and 9. A black plate 11 is provided in front of the wall 2 and spaced from the wall and covers the slot 6 and absorbs light which has been transmitted by the glass pane 4; that plate 11 also prevents scattered light from passing from the forward side of the wall 2 through the slot 6 and impinging on the cameras 8 and 9. The two fields of view 12 and 13 of the two cameras overlap each other and have an angular field $\alpha$. They serve to scan the glass pane line by line and for this purpose have such an orientation that the projection of the scanning line of the upper line camera 8 on the plane of pane travel 3 or on the glass pane 4 is aligned with the corresponding projection of the scanning line of the lower line camera 9. The line cameras 8 and 9 are spaced predetermined distances from each other and from the horizontal conveyor 1.

An incremental angle encoder 15 is mounted on a driven shaft 14 of the horizontal conveyor 1 and the output signals of the angle encoder 15 just as those of the two cameras 8 and 9 are delivered to an evaluating computer 16. The output of the computer is connected to the drive motor 17 of a tool, which is movable up and down on substantially vertical guide rods 19, which are parallel to the plane of pane travel and disposed behind a further slot 20, which is formed in the wall 2 and when viewed in the direction of travel 5 is spaced behind the slot 6. The tool 18 extends through the slot 20 for a processing of the glass plane 4 along its edge as soon as the glass pane 4 has entered the range of action of the tool 18. The apparatus operates as follows:

As soon as a glass pane 4 enters the field of view 12, 13 of the two line cameras, the two line cameras detect the height h of the glass pane, which in the illustrated example is a model pane, which differs from a rectangular configuration in that its top edge is oblique. The output signals of the cameras represent the height of the glass pane 4 and are delivered to the evaluating computer 16, by which the consecutively determined measured values of the height are associated with the simultaneously delivered measured values from the incremental angle encoder 15 so that the evaluating computer is furnished with the information how the height h of the glass pane 4 varies in dependence on the advance 1 of the glass pane. The data which reflect that dependency are temporarily stored in the evaluating computer 16 in a memory 21 and are used with a time delay to control the motor 17 for driving the tool 18. The time delay will depend on the distance from the tool 18 to the position assumed by the scanning line at the center of the slot 6; that distance is represented by a fixed number of up-counted pulses from the angle encoder 15. Instead of providing for a time delay, a delayed response of the control of the drive motor 17 may also be initiated in response to the delivery by the angle encoder of countable pulses in a predetermined number corresponding to the distance from the tool 18 to the position of the scanning lines; that practice will afford the advantage that the horizontal conveyor may temporarily be arrested.

For a check of the actual position of the tool, its drive motor may also be connected to an incremental angle encoder 22 for delivering output signals to a further input of the evaluating computer 16 for a check.

Figure 4:
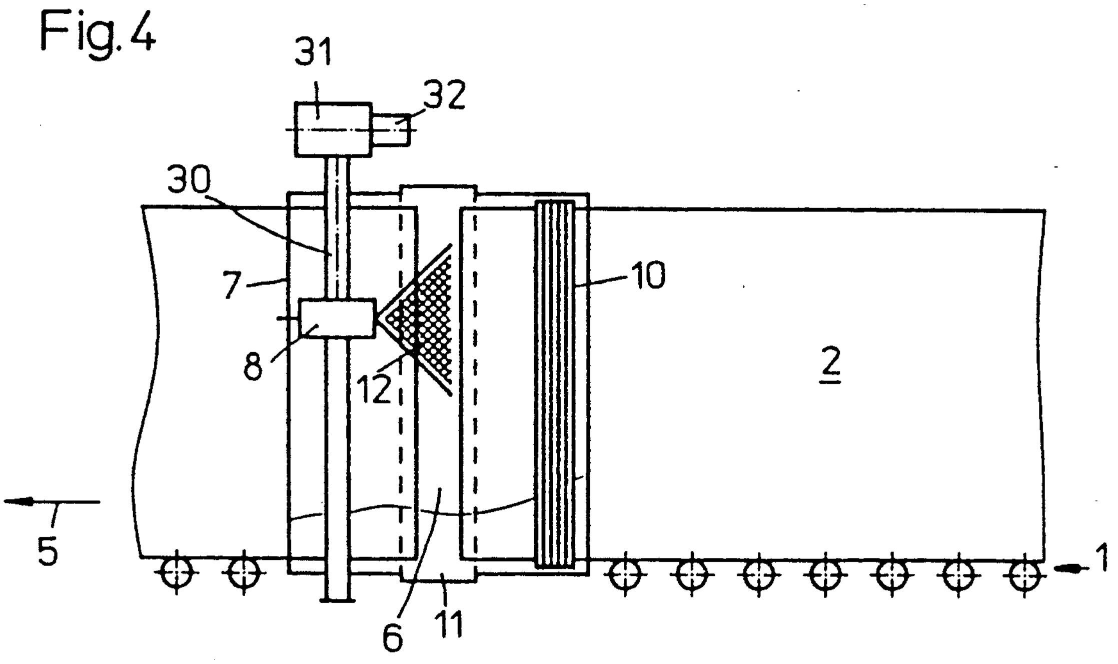
FIG. 4 shows a modification of the apparatus shown in FIG. 3 and illustrates an apparatus comprising only one line camera, which is adjustable in height.

The modified illustrative embodiment shown in FIG. 4 differs from the first illustrative embodiment only in that there is only one line camera 8 rather than two line cameras. The single camera which is provided is movable up and down by a motor 31 on a guide rail 30, which extends at right angles to the direction of travel 5 and parallel to the wall 2. The drive shaft of the motor 31 is connected to an incremental angle encoder 32, which also delivers output signals to the computer 16. That modified apparatus operates as follows: In the initial position the camera 8 is disposed on such a low level that its field of view will always cover the bottom edge of a glass pane 4. The position of the bottom edge is determined by the top edge of the horizontal conveyor. The camera may remain in its predetermined position as long as the top edge of the glass pane is also within the field of view 12 of the camera 8. But when the top edge of the glass pane 4 approaches the top edge of the field of view 12 and is spaced a predetermined distance therefrom as the glass pane 4 moves past the slot 6, the camera 8 is automatically raised for a certain distance and the displacement measured by the angle encoder 32 is delivered to the evaluating computer 16 and is taken into account therein for the determination of the result of the measurement. If the top edge of the glass pane is even initially outside the field of view 12, the camera will initially be raised to such an extent that the top edge of the glass pane 4 is within the field of view 12.

INDUSTRIAL UTILITY

The invention is applicable to the control of processing operations at the edges of glass plates, particularly in production lines for making insulating glass.

I claim:

1. An apparatus for controlling the movement of a tool (18) along the edge of glass panes (4), particularly of insulating glass panes, comprising
   - a horizontal conveyor (1), on which the glass panes (4) are conveyed while they are supported by backing means (2), which by their supporting forward surface define a plane of pane travel (3),
   - one or more optical sensors (8, 9) for scanning the glass panes (4),
   - and a drive motor (17) for displacing the tool (18) in a direction which is parallel to the plane of pane travel (3) and transverse to the direction of travel (5) of the horizontal conveyor (1),
   - characterized in that the optical sensors consist of one or more electronic line cameras (8, 9), which are so directed toward the plane of pane travel (3) that their scanning lines extend in or parallel to the plane of pane travel (3) and at right angles to the direction of travel (5),
   - a displacement pickup (15) for measuring the distance traveled is synchronized with the horizontal conveyor (1),
   - and an evaluating computer (16) is provided, which is connected at its input to the output of the line camera(s) (8, 9) and to the output of the displacement pickup (15) and at its output to the drive motor (17) of the tool (18).

2. An apparatus according to claim 1, characterized in that the line camera(s) (8, 9) is or are directed toward the plane of pane travel (3) at an angle ($\beta$) other than 90° to the direction of travel (5).

3. An apparatus according to claim 1, characterized in that the line camera(s) (8, 9) are directed at right angles to the direction of travel (5) but is or are directed toward the plane of pane travel (3) at an angle other than 90° to said plane.

4. An apparatus according to claim 1, characterized in that at least two line cameras (8, 9) are provided and on their object side have scanning lines aligned with each other and the scanning lines of adjacent line cameras (8, 9) overlap in part.

5. An apparatus according to claim 1, characterized in that the line camera(s) (8, 9) are adjustable but in other respects are stationary.

6. An apparatus according to claim 1, characterized in that only a single line camera (8) is provided,
   - said one line camera (8) is displaceable by a stepping motor (31) in a direction which is at right angles to the direction of travel (5) and parallel to the plane of pane travel (3),
   - and a displacement pickup (32) is synchronized with the stepping motor (31) and has an output which is connected to an input of the evaluating computer (16).

7. An apparatus according to claim 1, characterized in that a light source (10) which is directed toward the plane of pane travel (3) is provided on the same side of the plane of pane travel (3) as the line camera(s) (8, 9).

8. An apparatus according to claim 7, characterized in that a blackened surface (11) is provided on that side of the plane of pane travel (3) which faces away from the light source (10).

9. An apparatus according to claim 1, characterized in that the line camera(s) (8, 9) are arranged behind the backing means (2) and view the glass plates (4) through an aperture (6) in the backing means (2).

10. An apparatus according to claim 1, characterized in that the tool (18) comprises a rotary drive for rotating or pivotally moving the tool (18) about an axis that extends at right angles to the plane of pane travel and that the output of the evaluating computer (16) is connected also to the rotary drive.

11. An apparatus according to claim 10, characterized in that the evaluating computer (16) delivers to the drive motor (17) of the tool (18) a control signal which represents the dimension h of the glass pane (4) in a direction which is transverse to the direction of travel of the horizontal conveyor (1) in dependence on the output signal 1 of the displacement pickup (15) that is synchronized with the horizontal conveyor (1) and the evaluating computer (16) delivers to the rotary drive of the tool (18) a signal which represents the first derivative dh/dl of the dimension h.

12. An apparatus according to claim 1, characterized in that the evaluating computer (16) comprises a memory (21) for a temporary storage of the detected dimensions of the glass panes (4).

13. An apparatus according to claim 1, characterized in that the line cameras (8, 9) have a field of view composed of a plurality of lines.

14. An apparatus according to claim 1, characterized in that the line cameras (8, 9) comprises a light-sensitive receiver consisting of a single-line or multi-line CCD array.

15. An apparatus according to claim 2, characterized in that at least two line cameras are provided and on their object side have scanning lines aligned with each other and the scanning lines of adjacent line cameras overlap in part.

16. An apparatus according to claim 3, characterized in that at least two lline cameras are provided and on their object side have scanning lines aligned with each other and the scanning lines of adjacent line cameras overlap in part.

17. An apparatus according to claim 2, characterized in that the line cameras are adjustable but in other respects are stationary.

18. An apparatus according to claim 3, characterized in that the line cameras are adjustable but in other respects are stationary.

19. An apparatus according to claim 4, characterized in that the line cameras are adjustable but in other respects are stationary.

20. An apparatus according to claim 2, characterized in that only a single line camera is provided, said one line camera is displaceable by a stepping motor in a direction which is at right angles to the direction of travel and parallel to the plane of pane travel, and a displacement pickup is synchronized with the stepping motor and has an output which is connected to an input of the evaluating computer.

* * * * *